United States Patent [19]

Mally

[11] Patent Number: 5,141,762
[45] Date of Patent: Aug. 25, 1992

[54] APPARATUS AND METHOD FOR FORMING CASINGLESS SAUSAGE AND THE LIKE

[75] Inventor: Timothy G. Mally, Oregon, Wis.

[73] Assignee: Oscar Mayer Foods Corporation, Madison, Wis.

[21] Appl. No.: 712,009

[22] Filed: Jun. 7, 1991

Related U.S. Application Data

[63] Continuation of Ser. No. 575,044, Aug. 30, 1990, Pat. No. 5,115,732, which is a continuation of Ser. No. 400,080, Aug. 29, 1989, Pat. No. 4,989,505.

[51] Int. Cl.⁵ .............................................. A22C 7/00
[52] U.S. Cl. .................................. 426/412; 426/513; 99/353; 99/443 C; 99/483; 425/297; 425/311; 425/373
[58] Field of Search ................. 99/353, 355, 356, 359, 99/360, 371, 443 C, 483; 264/148, 310; 425/297, 311, 325, 327, 332, 373; 426/412, 513; 452/37–40

[56] References Cited

U.S. PATENT DOCUMENTS

| | | |
|---|---|---|
| 2,275,591 | 12/1955 | Cline et al. |
| 2,867,000 | 1/1959 | Huszar .......................... 425/297 |
| 2,953,461 | 9/1960 | Prohaska . |
| 3,005,716 | 10/1961 | Moreland . |
| 3,063,842 | 11/1962 | Podebradsky . |
| 3,456,285 | 7/1969 | Miller et al. |
| 3,537,385 | 11/1970 | Puschner et al. ........... 99/353 |
| 3,781,447 | 12/1973 | Durso ............................ 426/513 |
| 3,834,849 | 9/1974 | Supran et al. ................ 425/206 |
| 3,889,013 | 6/1975 | Moule ........................ 99/353 X |
| 3,902,388 | 9/1975 | New . |
| 3,916,483 | 11/1975 | Vinokur . |
| 4,025,273 | 5/1977 | Mauer et al. ................. 425/332 |
| 4,113,890 | 9/1978 | Long ........................ 99/355 X |
| 4,124,339 | 11/1978 | Bernard .................... 425/133.1 |
| 4,124,348 | 11/1978 | Fischer ........................ 425/297 |
| 4,192,639 | 3/1980 | Jones, Jr. ..................... 425/372 |
| 4,207,281 | 6/1980 | Bernard . |
| 4,258,066 | 3/1981 | Bernard ......................... 426/231 |
| 4,280,803 | 7/1981 | Treharne ........................ 425/99 |
| 4,294,858 | 10/1981 | Moule ..................... 426/513 X |
| 4,379,356 | 4/1983 | Geissbuhler . |
| 4,414,707 | 11/1983 | Koken . |
| 4,440,701 | 4/1984 | Ohki et al. ................ 264/310 X |
| 4,541,976 | 9/1985 | Batigne et al. ........... 425/297 X |
| 4,610,844 | 9/1986 | Matthews et al. ............ 426/641 |
| 4,642,847 | 2/1987 | Ross . |
| 4,726,093 | 2/1988 | Rogers . |
| 4,989,505 | 2/1991 | Mally ............................ 99/483 |

FOREIGN PATENT DOCUMENTS

| | | |
|---|---|---|
| 1207234 | 12/1965 | Fed. Rep. of Germany . |
| 1352152 | 1/1964 | France . |
| 2493678 | 5/1982 | France . |

Primary Examiner—Harvey C. Hornsby
Assistant Examiner—Mark Spisich
Attorney, Agent, or Firm—Lockwood, Alex, Fitzgibbon & Cummings

[57] ABSTRACT

An apparatus is provided for processing batter materials, such as food batter, including sausage batter for wieners and the like, without incorporating the use of any casing for the batter. The apparatus forms a blank having a proteinaceous skin made of congealing surface batter materials. Each thus formed blank is ejected onto a conveyor that includes a device for completing the formation of congealed skin on the blank. The thus shaped items can then be packaged and cooked within the package in order to provide an aseptic product. If desired, the items can be cooked and then packaged in order to provide a product having an acceptable shelf-life.

32 Claims, 2 Drawing Sheets

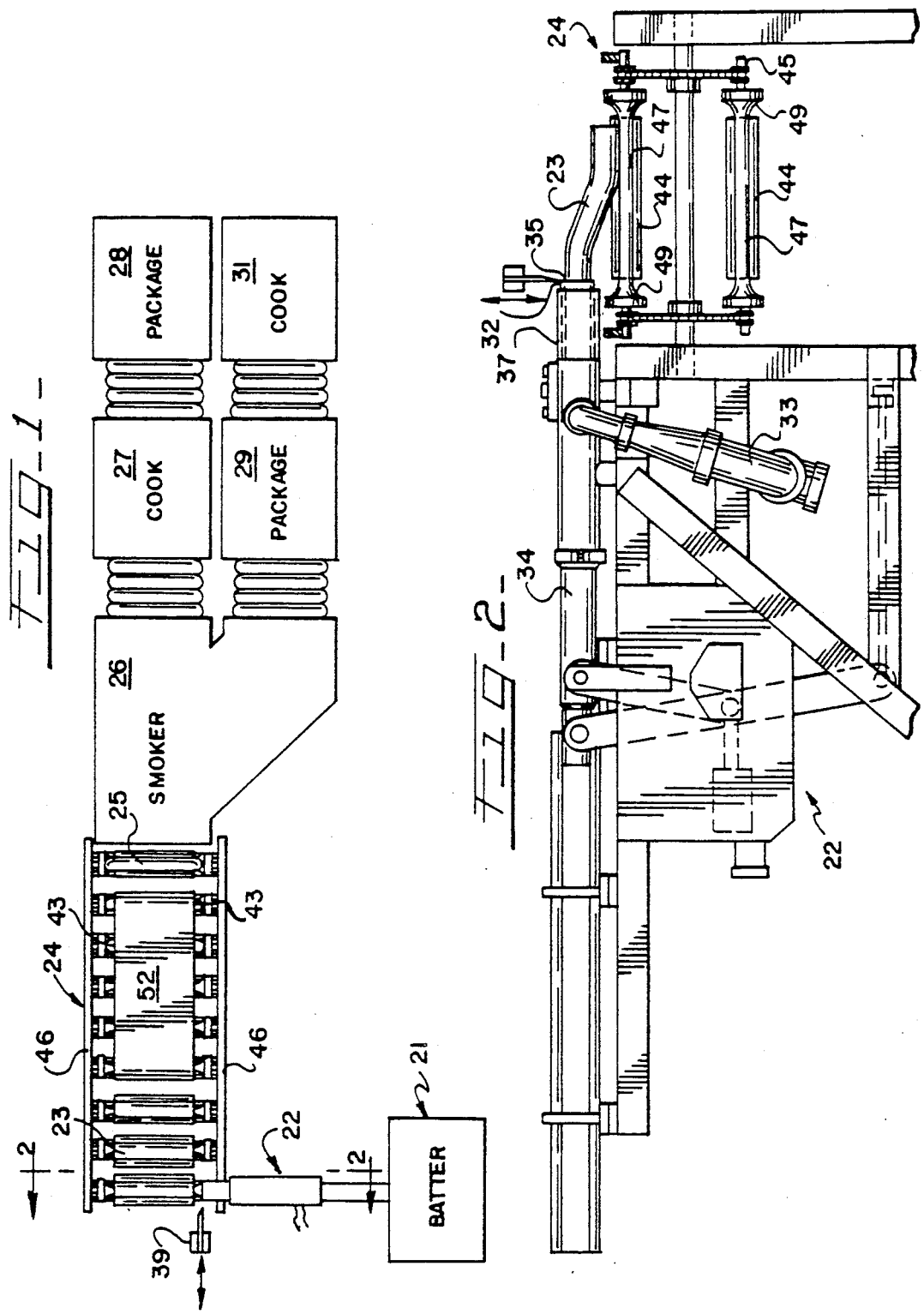

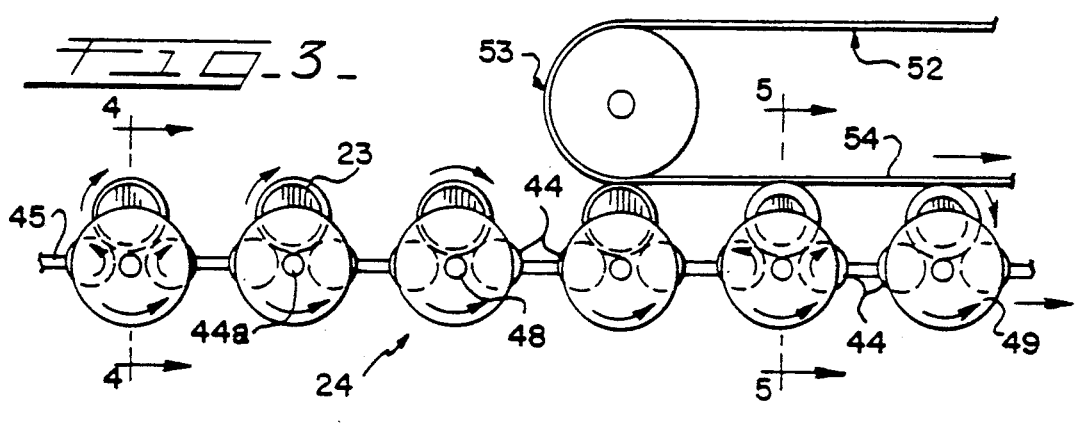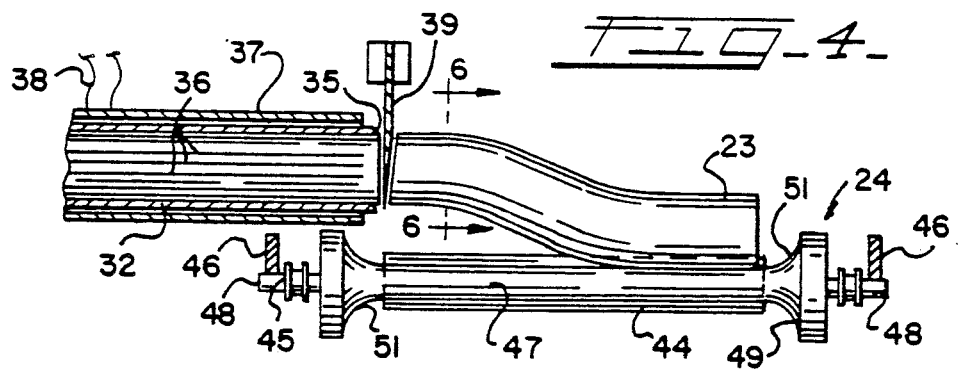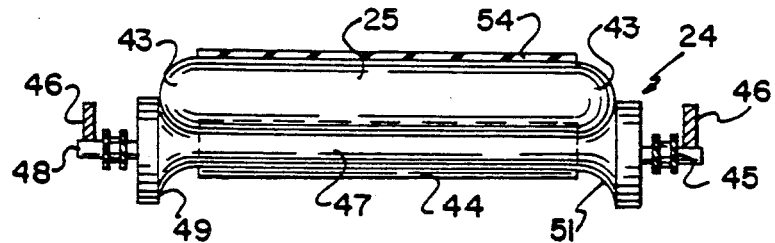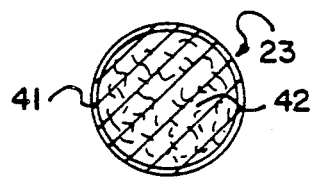

APPARATUS AND METHOD FOR FORMING CASINGLESS SAUSAGE AND THE LIKE

This application is a continuation, of copending application Ser. No. 575,044, filed Aug. 30, 1990 now U.S. Pat. No. 5,115,732, which is a continuation of application Ser. No. 400,080, filed Aug. 29, 1989, now U.S. Pat. No. 4,989,505.

BACKGROUND AND SUMMARY OF THE INVENTION

The subject invention generally relates to an apparatus for forming batter into a shaped product without using a casing or the like. More particularly, the invention relates to an apparatus for forming a casingless shaped product, such as a casingless sausage and the like, by forming a proteinaceous skin on batter materials in order to impart and maintain an initial shape to the batter material. A conveyor assembly, which receives the thus initially formed and shaped batter material, has an assembly for modifying the shape of at least one end of the initially shaped batter material, this shape-modifying assembly imparting a generally rounded configuration to the end portion of the initially shaped batter material by virtue of relative rotational movement between a surface of this assembly and the end portion of the batter material.

Various devices are known for shaping batter materials such as sausage batter, other food product batters and the like, and stuffing the batter into a casing, which casing can complete the shaping of the batter as desired while maintaining the desired shape during further processing. Often, the further processing includes cooking or other procedure which modifies the consistency of the batter such that it will substantially maintain its desired shape. At least in the case of wieners and other sausage products, each casing is subsequently removed during processing so that the product purchased by the consumer is a so-called casingless product, even though a casing had been used during processing. Such casing removal requires a specially designed apparatus, such as the one illustrated in Koken U.S. Pat. No. 4,414,707.

Various devices have been proposed for forming and processing sausages and the like without using casings. One suggested approach has been to form and cook a food batter within an elongated tube which has end-shaping plugs periodically spaced therewithin, as illustrated in U.S. Pat. No. 4,113,890. This requires a continuous inserting of the batter and plugs into the tube and a removal of the plugs and cooked batter out of the tube. Another patent, Rogers U.S. Pat. No. 4,726,093, proposes making food products such as skinless sausages through the use of a series of plugs that engage a tube within which the batter is cooked.

Another suggested approach is to use a plurality of hollow molding tubes that are conveyed sequentially through an endless path. Geissbuhler U.S. Pat. No. 4,379,356 proposes the use of a plurality of molds having an open end such that sausage material will expand out of the tube and, this patent suggests, be formed into rounded sausage ends when each molding tube is conveyed through a heating zone, which is shown as a hot water bath.

Suggestions in the art as are exemplified by these patents call for shaping of a batter-originating product within a tube or mold and thereafter removing the finally shaped product from the mold, and typically from a plurality of mold cavities or a mold cavity having a plurality of molding locations. Proposals of this general category tend to require complicated apparatus features, often including a complex molding structure having various moving parts and/or multiple components, which at times must be accurately indexed and/or aligned with respect to each other.

By proceeding in accordance with the present invention, batter such as sausage batter and the like is transformed into a shaped product such as a sausage or the like without having to form that product within a casing and subsequently remove and discard the casing. An apparatus is provided wherein the batter is stuffed into a shaped cavity having means for heating the batter in order to thereby form a proteinaceous skin, which skin holds the batter together and imparts to it a preliminary shape which approximates the desired final shape of the product. This preliminarily shaped product, or blank, is removed from the molding assembly and deposited on a conveyor for further shaping into the desired end product. In an illustrated embodiment, the conveyor includes a rotating end forming assembly for engaging at least one end of the initially shaped batter blank into a generally rounded configuration by relative rotational movement between the blank and the end forming assembly. Typically, an assembly also is provided whereby elongated peripheral pressure is imparted to the blank in order to facilitate movement of the batter toward and into engagement with the rotating end forming assembly.

It is a general object of the present invention to provide an improved apparatus for transforming batter into shaped products without utilizing casings or the like.

Another object of the present invention is to provide an improved apparatus that includes forming at least a portion of a batter-originating product with an assembly which does not include a product-conforming mold.

Another object of this invention is to provide an improved apparatus for making casingless food products that can be cooked and then packaged.

Another object of the present invention is to provide an improved apparatus for forming casingless products that can be packaged and then aseptically cooked within the package.

Another object of this invention is to provide an improved sausage-making apparatus which is of an especially simplified construction.

Another object of the present invention is to provide a sausage-making apparatus which reduces the cost of utilities when compared with conventional casing-utilizing systems.

Another object of the present invention is to provide an apparatus for making sausages and the like that does not require any casing removal devices.

These and other objects, features and advantages of the present invention will be clearly understood through a consideration of the followed detailed description.

BRIEF DESCRIPTION OF THE DRAWINGS

In the course of this description, reference will be made to the attached drawings, wherein:

FIG. 1 is a top plan view of a sausage processing line incorporating features according to the present invention;

FIG. 2 is an enlarged, primarily elevational detail view, generally taken along the line 2—2 of FIG. 1;

FIG. 3 is an elevational view of a shaping conveyor assembly according to the invention;

FIG. 4 is an enlarged, generally cross-sectional view substantially along the line 4—4 of FIG. 3;

FIG. 5 is an enlarged, generally cross-sectional view substantially along the line 5—5 of FIG. 3; and FIG. 6 is a cross-sectional view along the line 6—6 of FIG. 4.

DESCRIPTION OF PARTICULAR EMBODIMENTS

FIG. 1 illustrates a layout for a sausage processing line incorporating the present invention. A batter preparation apparatus 21 includes mixing and feeding assemblies of generally known construction by which components such as sausage ingredients are combined and blended to desired product identity, consistency, taste and the like into a pumpable batter. Batter preparation apparatus 21 feeds into a stuffing and shaping apparatus 22, which is illustrated in greater detail in FIG. 2. The stuffing and shaping apparatus 22 ejects partially shaped products or blanks 23 onto a conveyor assembly, generally designated as 24. Preferably, conveyor assembly 24 completes formation of the blanks 23 into uncooked products 25.

Uncooked products 25 can then be processed as needed or desired. For example, sausage products 25 can be flavored in a smoker apparatus 26, which can be of generally known construction. FIG. 1 illustrates cooking and packaging arrangements which can be utilized or eliminated as desired. A cooking apparatus 27 can precede a packaging apparatus 28, typically of generally known construction. An alternative packaging apparatus 29 and cooking apparatus 31 can be provided, as discussed in greater detail hereinafter.

With more particular reference to the stuffing and shaping apparatus 22, same includes a molding compartment, such as the illustrated tube 32. Batter from the batter preparation apparatus 21 is pumped to the molding compartment 32 through suitable equipment such as that including the illustrated supply line 33. A suitable ejection mechanism, for example the illustrated piston or ram mechanism 34, will eject the partially shaped products or blanks 23 out of an open end 35 of the molding component 32. In the embodiment illustrated in the drawings, a single blank 23 is formed during each cycle of the apparatus, although it will be appreciated that multiple product blank formation or generally continuous product blank formation could be carried out by appropriately modifying the equipment.

In a preferred embodiment of the invention which is shown in the drawings, the inside diameter of tube 32 is slightly larger than the desired outside diameter of the finished product. This is due to the slight reduction in size of the blank 23 which is carried out on the preferred conveyor assembly 24 as discussed elsewhere herein. When desired, a plurality of elongated wires 36 may be included within the molding compartment 32 in order to generally longitudinally orient hide fibers or other components of the pumped batter.

A heating assembly 37 is associated with the molding compartment 32. When the molding compartment is generally tubular in shape, it is preferred that the heating assembly 37 provide a tubular heating surface in order to thereby heat the tubular inside surface of the molding compartment 32. Batter passing through the tube on a continuous flow basis is thereby surface cooked or congealed in order to form a proteinaceous skin of batter materials. A typical skin in this regard is on the order of about 0.020 to about 0.050 inch thick. Heating assembly 37 will typically be able to form this proteinaceous skin during a very short time period, typically on the order of about one to two seconds when the heating assembly 37 outputs a temperature of between about 410° and about 440° F. Conditions such as these are typically suitable when the batter material is a sausage batter. In this situation, no sticking is observed with a stainless steel internal surface of the molding component. This non-sticking, even flow of batter appears to be facilitated by a small amount of rendering that apparently occurs when a sausage batter or the like is subjected to the conditions imparted by the tube 32 and heating assembly 37. Heating assembly 37 is energized from a suitable energy supply such as the illustrated conductors 38.

Means are provided for severing the batter into the partially shaped products or blanks 23. For example, a knife assembly 39 is shown positioned at a location which is closely spaced from the open end 35 of the molding compartment 32. The thus severed blanks 23, which are most conveniently deposited directly onto the conveyor assembly 24, include a proteinaceous skin 41 (FIG. 6) which performs a function on the order of that performed by a casing required of material processed on previously used equipment and maintains the desired general shape (such as the illustrated elongated cylinder) of the blank 23. Each blank 23 also includes a core portion 42, which is essentially raw batter. Each blank 23 has enough integrity in order to be handled for further processing.

Referring more specifically to the conveyor assembly 24, it is capable of receiving a plurality of partially shaped products or blanks 23 and conveying them for shaping into the uncooked products 25. The preferred conveyor assembly 24 preferably includes an assembly for applying inwardly directed pressure onto the exterior periphery of each blank 23 in order to thereby exert a generally compressive, moderate force onto the blank. As a result, raw batter of the core portion 42 of each blank spreads generally outwardly. In the illustrated generally cylindrical products, the raw batter moves substantially longitudinally and outwardly, and this raw batter is then formed into generally finished ends 43 in which the proteinaceous skin 41 thereby substantially completely envelopes the core portion of raw batter 42.

The illustrated conveyor assembly 24 includes a plurality of generally parallel rollers 44 which are secured to a chain assembly 45. The chain assembly 45 will typically take the form of an endless conveyor which includes a run that receives the blanks 23 and conveys them away from the stuffing and shaping apparatus 22. Rollers 44 are spaced such that a pair of them support and rotate a blank 23. Smaller, intermediate rollers 44a can be spaced between these roller pairs, as needed or desired to properly support the blanks 23. Preferably, some or all of the rollers are driven, for example by rolling engagement with a rail 46, or by any other suitable rotation-imparting mechanism. Any suitable arrangement for driving the rollers can be utilized, provided the rollers can be driven while the chain assembly 45 traverses its conveyed pathway. Rotation of the rollers assists in maintaining a substantially round cross section to each blank 23 and in minimizing the formation of any processing marks thereon.

Conveyor assembly 24 further includes a plurality of forming rollers 47, preferably also rotatably mounted to the chain assembly 45. Rotational driving of each forming roller 47 can be accomplished in substantially the same manner as is achieved for rollers 44 and/or 44a; for example, rod extensions 48 can engage the rail 46. Preferably, each forming roller 47 is in continuous rotating engagement with at least a portion of each of the blanks 23. Forming rollers 47 include end flanges 49. Illustrated end flanges 49 include a surface which, when rotated during engagement with batter flowing from the blanks 23, will shape that batter into the desired shape of a generally finished end 43. In the illustrated embodiment, this is accomplished by a curved, flared spool-like surface 51. When the end flange 49 rotates, the curved, flared surface 51 provides a continuous curved (typically semi-circular) shaping edge. Preferably, at least the end flange 49 of each forming roller is heated so that the generally concave shaping edge of each curved flared surface 51 will form the proteinaceous skin 41 over the generally finished ends 43 of the uncooked products 25. Typically, a temperature of on the order of approximately 290° to 310° F. will achieve the desired degree of skinning over at the surface 51.

In order to insure that the batter 42 will efficiently and quickly flow beyond the initially formed end of each blank 23, a squeeze assembly 52 for exerting pressure onto each blank 23 is positioned in generally opposing relationship to the chain assembly 45. The illustrated squeeze assembly 52 includes an overhead conveyor assembly 53 which has a substantially flat belt 54 that engages each blank 23, which blank is then compressed or squeezed between the belt 54 and the roller pair 44 and forming roller 47 associated with that particular blank 23. Preferably, belt 54 is not precisely parallel to the chain assembly 45, but the space between the roller chain assembly 45 and the flat belt 54 gradually decreases in the downstream direction. The extent of this decrease or taper need not be substantial. For example, for a typical wiener, the decrease need be only on the order of approximately 1 millimeter in order to ensure proper formation of the generally finished ends 43. In other words, for a typical wiener, the diameter of the uncooked product 25 is on the order of approximately 1 millimeter less than the diameter of the blank 23.

When provided, the smoker apparatus 26 can include a smoke chamber of generally known construction. Particularly efficient smoking can be practiced inasmuch as the uncooked products 25 do not have a casing, which would otherwise have to be penetrated by the smoke media when other devices are used. Facilities could also be provided for the utilization of liquid smoke or other flavoring components or devices. Uniformity of smoke application can be enhanced by continuing the roller conveyor into and through the smoker apparatus 26.

Concerning the combination illustrated in FIG. 1 of the cooking apparatus 27 followed by the packaging apparatus 28, the conveyor assembly 24 can continue into the cooking apparatus 27 in order to undergo generally conventional cooking procedures. Exemplary heating procedures would include oven heating, convection heating and/or microwave heating. The thus cooked products are then transferred to a packaging apparatus of a generally known type. By this procedure, a vacuum packaged grouping of casingless products, such as wieners, are provided, and these packaged products will have a shelf-life of an acceptable length.

Because the uncooked products 25 can be handled, at least to a certain extent, prior to cooking them, and because there is no casing that needs to be removed after cooking, it is possible to package the uncooked products 25 in the alternative packaging apparatus 29. Generally speaking, these uncooked products 25 are packaged in a substantially raw state. Subsequent cooking in the alternative cooking apparatus 31 is carried out after packaging, thereby enabling the formation of an aseptic package of the desired products, such as wieners, other sausages, or the like. The alternative cooking apparatus 31 would typically include a hot-water cooking bath, a hot platter cooking apparatus, or the like. By utilizing this apparatus to form an aseptic package, subsequent treatments to enhance shelf-life, such as temperature reduction devices, can be eliminated.

While particular embodiments of the invention have been described, it will be apparent to those skilled in the art that various modifications thereof may be made without departing from the true spirit and scope of the invention. Accordingly, it is intended by the appended claims to cover all such modifications and equivalents which embody the inventive features as defined in the claims.

I claim:

1. An apparatus for forming a casingless sausage and the like, comprising:
    means for stuffing and shaping flowable batter material;
    forming means associated with said stuffing and shaping means, said forming means being for forming a proteinaceous skin of batter material from the batter material of the stuffing and shaping means;
    ejecting means for removing a blank from the stuffing and shaping means, the blank having a shape determined by said stuffing and shaping means, the blank further having an external surface including the proteinaceous skin and a core portion including batter material which has not been formed into the proteinaceous skin; and
    conveyor means for receiving and conveying the blank, said conveyor means including end forming means for engaging batter material at at least one end of the blank and for shaping the end batter material into a generally rounded configuration by engagement between the blank and the end forming means to thereby form a shaped product.

2. The apparatus according to claim 1, wherein said end forming means includes a rotatable roller having an end flange with a curved flared surface that rotatably engages batter material at the at least one end of the blank.

3. The apparatus according to claim 1, wherein said end forming means includes heating means for forming a proteinaceous skin from the end batter material.

4. The apparatus according to claim 1, further including a squeeze assembly which is positioned generally opposite to said conveyor means such that the blank engages both the conveyor means and the squeeze assembly.

5. The apparatus according to claim 4, wherein the squeeze assembly and the conveyor means are spaced apart by a distance approximating the height of the blank, and the distance tapers gradually downwardly in the downstream direction of the conveyor means, whereby the blank is subjected to squeezing forces when it moves between the squeeze assembly and the conveyor means.

6. The apparatus according to claim 4, wherein said end forming means includes a rotatable roller having an end flange with a curved flared surface that rotatably engages batter material at the at least one end of the blank, and the squeeze assembly and the conveyor means cooperate to squeeze batter material from the blank and into engagement with said end flange of the end forming means.

7. The apparatus according to claim 6, wherein said end forming means includes heating means for forming a proteinaceous skin from the end batter material.

8. The apparatus according to claim 1, wherein said end forming means includes a rotatable roller having an end flange with a generally concave surface that engages the batter material at the at least one end of the blank, and wherein said concave surface is a heated surface that forms a proteinaceous skin from the end batter material.

9. The apparatus according to claim 8, further including a squeeze assembly which is positioned generally opposite to said conveyor means such that the blank engages both the conveyor means and the squeeze assembly, and the squeeze assembly and the conveyor means cooperate to squeeze batter material from the blank and into engagement with said end flange of the end forming means.

10. The apparatus according to claim 1, wherein said conveyor means includes a plurality of rollers, and wherein the blank is supported by at least a pair of said rollers.

11. The apparatus according to claim 10, wherein said rollers rotate the blank.

12. The apparatus according to claim 1, wherein said means for stuffing and shaping flowable batter provides a continuous flow of batter, and a knife assembly is provided for severing the continuous flow of batter into the blanks, said knife assembly being downstream of said forming means.

13. The apparatus according to claim 1, further including an overhead flat belt conveyor positioned generally above said conveyor means at a distance whereby the blank is subjected to a moderate squeezing force when moving between the overhead flat belt conveyor and said conveyor means.

14. The apparatus according to claim 1, further including means for cooking the shaped product, said cooking means being downstream of said conveyor means.

15. The apparatus according to claim 1, further including packaging means for inserting the shaped product into a package and means are provided downstream of said packaging means for cooking the shaped product while it is within the package.

16. An apparatus for forming a casingless sausage and the like, comprising:
means for stuffing and shaping flowable batter material, said stuffing and shaping means having a generally tubular interior surface;
forming means associated with said stuffing and shaping means, said forming means being for forming a generally cylindrical proteinaceous skin of batter material from the batter material of the stuffing and shaping means;
ejecting means for removing a generally cylindrical blank from the stuffing and shaping means, the blank having an external surface including the proteinaceous skin and a generally cylindrical core portion including batter material which has not been formed into the proteinaceous skin; and
conveyor means for receiving and conveying the blank, said conveyor means including end forming means for rotatably engaging batter material at at least one end of the blank and for shaping the end batter material into a generally domed configuration by engagement between the blank and the end forming means to thereby form a product having a sausage-like shape.

17. The apparatus according to claim 16, wherein said end forming means includes a rotatable roller having an end flange with a generally concave curved flared surface that rotatably engages batter material at the at least one end of the blank, and said end forming means includes heating means for forming a proteinaceous skin having said generally domed configuration.

18. The apparatus according to claim 17, further including a squeeze assembly which is positioned generally opposite to said conveyor means such that the blank engages both the conveyor means and the squeeze assembly, and the squeeze assembly and the conveyor means cooperate to squeeze batter material from the blank and into engagement with said end flange of the end forming means.

19. The apparatus according to claim 16, further including an overhead flat belt conveyor positioned generally above said conveyor means at a distance whereby the blank is subjected to a moderate squeezing force when moving between the overhead flat belt conveyor and said conveyor means.

20. The apparatus according to claim 16, further including packaging means for inserting the sausage-like shaped product into a package and means are provided downstream of said packaging means for cooking the shaped product while it is within the package.

21. A method for claiming a casingless sausage and the like, comprising the steps of:
stuffing and shaping flowable batter material into a shaped batter component;
forming on said shaped batter component a proteinaceous skin of batter material from the batter material of the shaped batter component in order to thereby provide a blank having a shape determined during said stuffing and shaping step, the blank further having an external surface including the proteinaceous skin and a core portion including batter material which has not been formed into the proteinaceous skin;
receiving and conveying the blank in a downstream direction and shaping batter material at at least one end of the blank; and
said downstream shaping step includes engaging the end batter material with an end forming surface to thereby form a shaped product with an end having a generally rounded configuration.

22. A method according to claim 21, wherein said downstream shaping step includes heating the end batter material to form a proteinaceous skin on the end having a generally rounded configuration.

23. The method according to claim 21, wherein said downstream shaping step further includes squeezing the blank in a generally radial direction.

24. The method according to claim 23, wherein the squeezing step includes positioning and moving the blank between generally opposing surfaces which are spaced apart by a distance that tapers gradually downwardly in a downstream direction to subject the blank to increasing squeezing forces applied to the blank when the blank moves in the downstream direction.

25. The method according to claim 24, wherein said downstream shaping step includes heating the end batter material to form a proteinaceous skin on the end having a generally rounded configuration.

26. The method according to claim 21, wherein said downstream shaping step includes providing the end forming surface as a generally concave surface and engaging same with the batter material at the at least one end of the blank.

27. The method according to claim 21, wherein said forming step includes heating said shaped batter component to form the proteinaceous skin of batter material.

28. The method according to claim 21, wherein said conveying step includes supporting the blank by at least a pair of rollers.

29. The method according to claim 28, wherein said supporting step includes rotating the blank.

30. The method according to claim 21, wherein said stuffing and shaping step provides a continous flow of batter, and further including severing the continuous flow of batter into a plurality of blanks.

31. The method according to claim 21, further including cooking the shaped product subsequent to said downstream shaping step.

32. The method according to claim 21, further including inserting the shaped product into a package and cooking the shaped product while it is within the package.

* * * * *

UNITED STATES PATENT AND TRADEMARK OFFICE
CERTIFICATE OF CORRECTION

PATENT NO. : 5,141,762
DATED : August 25, 1992
INVENTOR(S) : Timothy G. Mally

It is certified that error appears in the above-indentified patent and that said Letters Patent is hereby corrected as shown below:

TITLE PAGE, ITEM [56]:
Under U.S. References Cited, "2,275,591", the patent number for
    Cline etal., should read --2,725,591--.
Col. 8, line 37, "claiming" should read --forming--.

Signed and Sealed this

Seventh Day of February, 1995

Attest:

BRUCE LEHMAN

Attesting Officer          Commissioner of Patents and Trademarks